Sept. 29, 1936.　　　　T. ROBINSON　　　　2,055,612
METHOD OF MAKING EMULSIONS
Filed Oct. 12, 1933　　　2 Sheets-Sheet 2
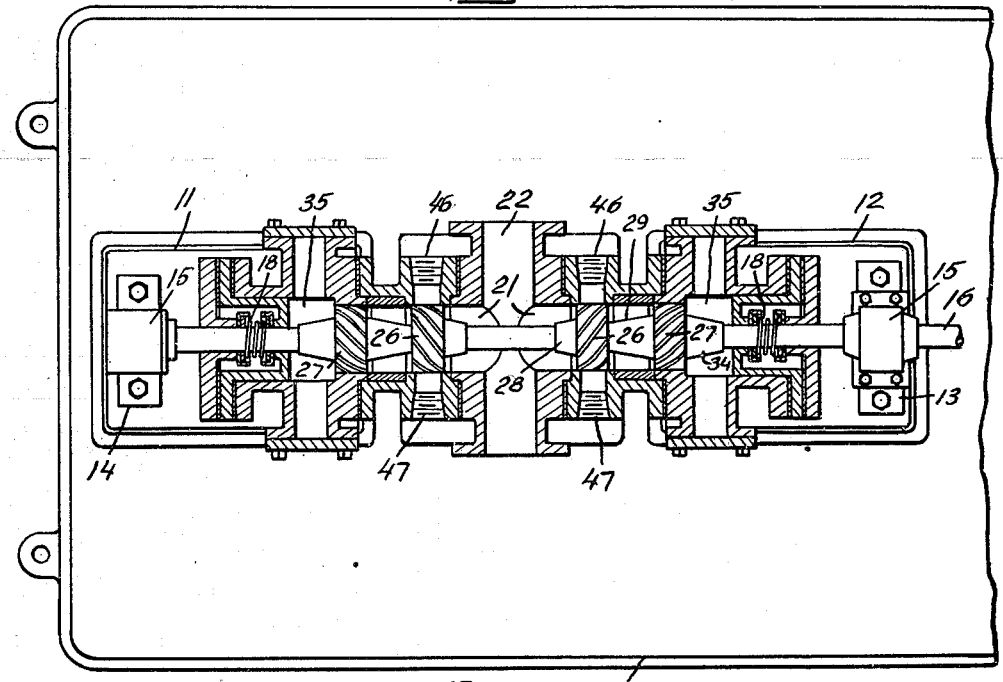
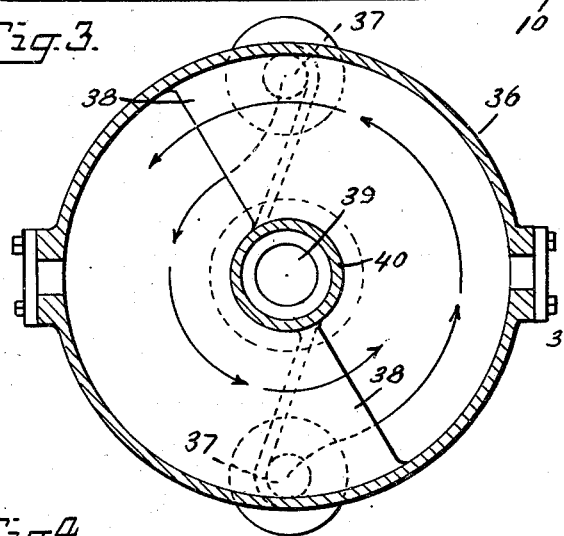
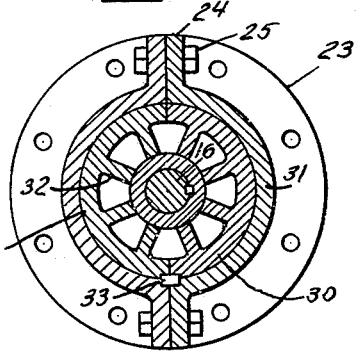
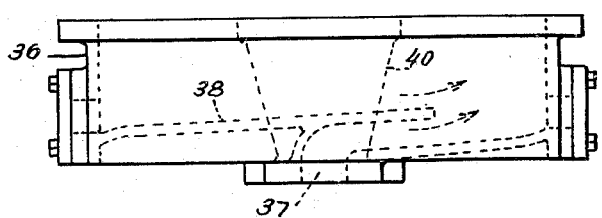
INVENTOR
Thomas Robinson
BY
ATTORNEYS Patented Sept. 29, 1936

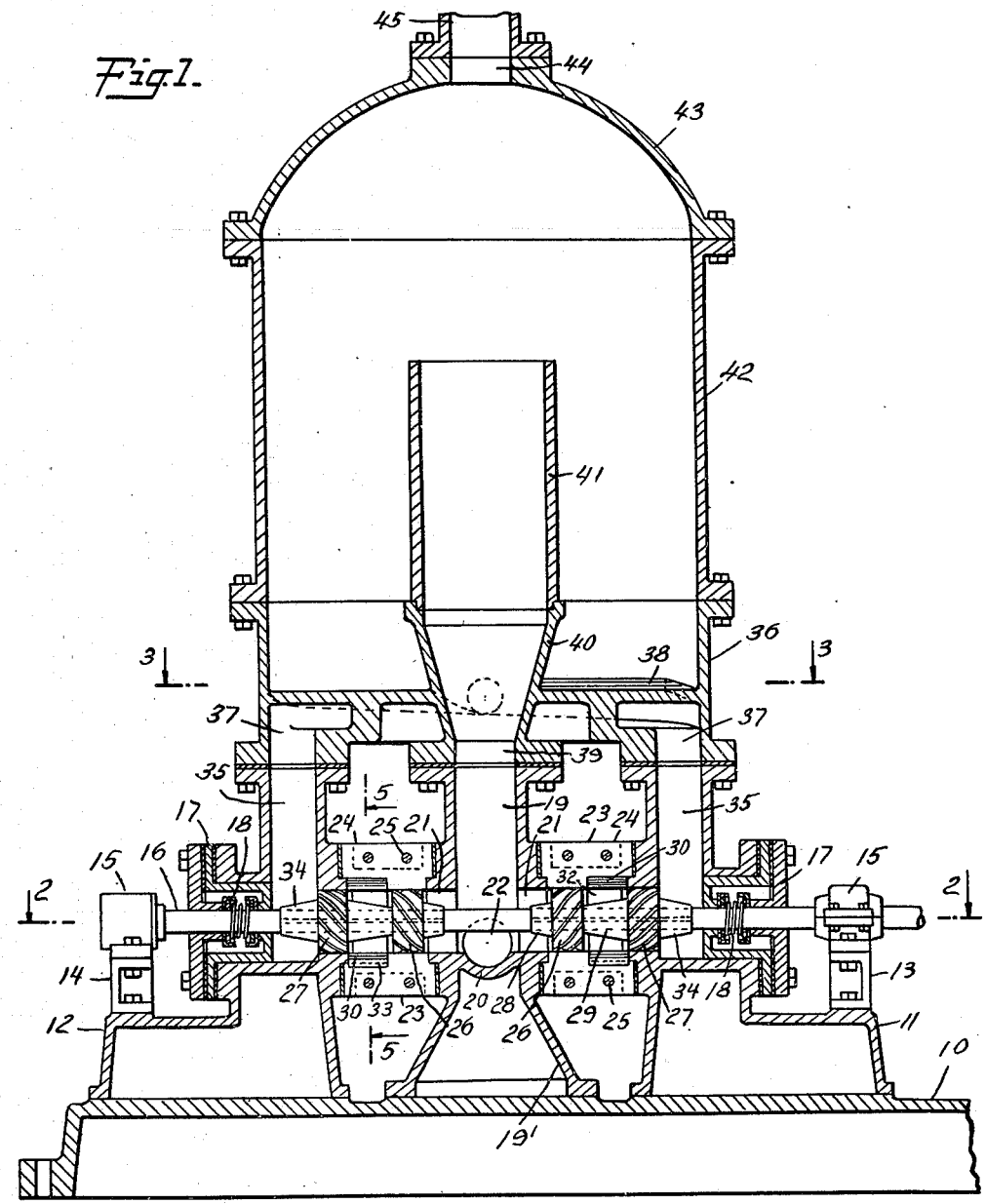

2,055,612

UNITED STATES PATENT OFFICE 2,055,612

METHOD OF MAKING EMULSIONS

Thomas Robinson, Smithtown, N. Y., assignor to Lancaster Processes, Inc., Long Island City, N. Y., a corporation of New York Application October 12, 1933, Serial No. 693,392

7 Claims. (Cl. 252—6)

This invention relates to the manufacture of dispersions and is concerned more particularly with a novel method by which such products can be produced rapidly and at low cost and with a new apparatus by which this method can be advantageously practiced. The new method and apparatus may be employed in the manufacture of a wide variety of dispersions, but for purposes of explanation, the principles of the invention will be described in connection with the production of emulsions of bituminous substances, such as asphalt. It is to be understood and will be apparent, however, that the utility of the invention is not restricted to the making of that particular emulsion and that the new apparatus may be used for purposes other than the production of emulsions.

In my Patent No. 1,923,888, August 22, 1933, I disclosed a method of making emulsions, according to which a circulating stream of water, emulsifying material, and previously emulsified material is created and fresh stock to be emulsified and water and emulsifying agent are continuously introduced into the stream. In order to effect emulsification of the fresh stock, the stream is subjected to the impact action of high velocity blades beyond the point of admission of the fresh stock and after leaving the region in which the blades act, the stream enters a circulating chamber from which a portion of the finished product is continuously removed, while the remainder is recirculated.

The present method and apparatus resemble those disclosed in the patent referred to and involve the use of certain of the same principles, but this invention is a departure from that of the patent in numerous respects and the differences have made it possible to produce better emulsions at higher output rates.

According to the new method, a stream of mother liquor containing previously emulsified material, water, and emulsifying agent is created, and the fresh stock to be emulsified is fed into the stream of mother liquor in a way which results in a fine dispersion of the fresh stock. For this purpose, the fresh stock does not flow directly and freely into the stream of mother liquor but end sections are cut from the stream of fresh stock and mingled with subdivisions of the mother liquor stream. Preferably, the severing operation referred to is carried on by high velocity rotating blades, which have a shearing action and operate in a tube through which the mother liquor stream flows. The blades divide this stream into a plurality of smaller ones which are momentarily kept separate, and the fresh stock is fed through the tube wall at the periphery of the group of blades so as to enter a part of the small streams and thereby enrich the mother liquor in those streams. At the same time, water and an emulsifying agent are introduced into the other subdivisions of the main stream of mother liquor to dilute the liquid therein. Thereafter, the enriched and diluted streams of mother liquor are mingled under conditions of great turbulence, and the combined and augmented stream is subjected to agitation and then passes into a storage chamber from which a part of the material is continuously discharged and the remainder recirculated.

In actual practice, two main circulating streams have been employed with each stream flowing from the circulating chamber to its own operating tube. In each tube, there is a set of helical blades which sub-divide the stream into the smaller ones and on one side of the tubes and in alignment with the blades, the material to be emulsified is introduced into the tube through the wall. On the opposite side of the tube, the water and emulsifying agent are similarly introduced and after the enriched and diluted streams are mingled, the resulting stream is subjected to hydraulic and mechanical shear in the tube with the result that a highly effective dispersion of the material to be emulsified is obtained.

The new method and apparatus include numerous features of novelty in addition to those above pointed out, such as emulsification under pressure and without air infiltration, and these features will be pointed out in the detailed description to follow. In connection with that description, reference may be had to the accompanying drawings, in which Figure 1 is a view of one form of the new apparatus in vertical section;

Figure 2 is a sectional view on the line 2—2 of Figure 1;

Figure 3 is a sectional view on the line 3—3 of Figure 1;

Figure 4 is a view of part of the apparatus in side elevation; and

Figure 5 is a sectional view on the line 5—5 of Figure 1;

Referring now to the drawings, the apparatus in the form illustrated includes a bed plate 10 on which are mounted base T's 11 and 12 which carry blocks 13 and 14 for bearings 15 for a shaft 16. In the horizontal leg of each T is mounted a stuffing box filled with oil and containing suitable seal ring assemblies 18 which prevent the escape of liquid outward from the T's along the shaft which extends through the stuffing boxes.

Mounted on the bed plate between the two T's is a body member 19', the upper end of which is hollow to form a vertical passage 19, the lower end of which is closed by a partition 20. Just above the partition, the body is provided with aligned outlets 21 and the shaft 16 extends through the outlets and across the lower end of the passage 19. The lower part of the body is provided with an inlet opening 22 through which material may be introduced into the body, if desired.

Between each base T and one side of the body is a disperser tube, generally designated 23, each tube, as shown in Figure 5, being made up of a pair of semi-cylindrical sections having flanged edges 24 connected together by bolts 25. Within each disperser tube, the shaft is provided with spaced sets of impeller blades, 26, 27, and these blades are helically formed and their outer edges lie close to the inner surface of the tube. On each side of each set of blades 26, the shaft carries collars 28, 29 having conical surfaces and in registry with each collar 29 is a set of stator vanes 30. These vanes extend radially inward from the wall of the tube and their inner ends are cut off at an angle so as to lie close to the surface of a collar 29. Each set of vanes is made in two parts, each part consisting of a semicircular portion 31 with which the vanes 32 are integrally formed. The two parts 31 lie in contact with the inner wall of the tube and are held against rotation by means of a key 33. The shaft 16 carries conical collars 34 beyond each set of blades 27, these collars lying in the passages 35 formed in upright legs of the base T's 11 and 12.

Mounted on top of the body and the T's is a bowl 36, which has inlet openings 37 which register with the upper ends of the passages 35. Partitions 38 within the bowl overlie the openings 37, these partitions being inclined upwardly to a slight extent, as indicated in Figure 4. Centrally the bowl is provided with an opening 39 registering with the passage 19 in the body and leading upward from the opening 39 is a partition 40 of generally conical shape on the upper end of which is mounted a tube 41 having an open top. On top of the bowl is a tubular section 42, the upper end of which is closed by a cover 43 having an outlet opening 44 from which leads a discharge pipe 45. This pipe may contain a valve not shown.

In the wall of each of the disperser tubes 23 are diametrically opposed openings 46 and 47, which lead to the sets of blades 26 and pipes connected to the openings supply material to be emulsified, such as asphalt in hot fluent condition, to the openings 46, for example, and water and emulsifying agent, such as soap, alkali, trisodium phosphate, etc., to the openings 47.

During the operation of the device, the circulating chamber formed by the bowl, tubular section, and cover is filled with a mother liquor containing previously emulsified material, water, and emulsifying agent, and the liquor continuously flows down through the pipe 41 and partition 40, and into the body 19. The stream is then divided and part flows through one disperser tube and part through the other. The fresh stock to be emulsified is introduced into each disperser tube opposite the first set of impeller blades through an opening, such as that designated 46, and water and emulsifying agent are introduced through the opening 47.

As the stream of mother liquor reaches the first set of impeller blades in a tube, it enters the spaces between the blades and is thereby sub-divided into smaller streams which are momentarily kept separate. The fresh stock enters the streams between the blades at one side of the tube, and just as the stream of fresh stock flows into the tube, end sections of the stream are sheared from it and mingled with the liquor in part of the subdivisions of the main stream of mother liquor by the action of the rapidly moving blades. In the other subdivisions of the main stream, water and emulsifying agent are introduced in the same manner. The liquor in part of the main stream is thus enriched while the liquor in the remainder is diluted, and the fresh stock is finely dispersed in the enriched liquor by the blades.

The enriched and diluted streams of mother liquor are rapidly propelled out from between the blades and are mixed together with a whirling motion which is almost at once converted into rectilinear movement by the entrance of the liquid into the spaces between the stator vanes. The liquid issuing from between the vanes then enters the spaces between the blades of the second set 27 and is subjected to violent agitation and is forced onward into the passage 35 and upward into the bowl. The partition 38 which lies over each inlet opening at the bottom of the bowl directs the liquid into the bowl so that it has an upward helical motion, and the two streams of liquid entering the bowl are kept separate by the partitions for a substantial distance so that upward helical travel of the liquid in the bowl and circulating chamber for a substantial distance is insured. Some of the liquid flows then over the top of the partition 41 and is recirculated, while the remainder passes out through the discharge pipe 45.

In each disperser tube, the action of the first set of blades results in the fresh stock being subjected to mechanical shear and the main stream is thereafter subjected to hydraulic shear by the action of the vanes and the second set of blades. The action of the blades and vanes is increased in effectiveness by the use of the collars on the shaft, since these collars cooperate with the walls of the disperser tube to confine the liquid in the form of a thin annular stream so that the liquid is acted on by the ends of the blades, which are traveling at the highest velocity.

In the apparatus, it will be observed that the only places where a moving part passes through a stationary part are at the discharge ends of the disperser tubes and consequently, the emulsification is carried on without air infiltration. Also, the emulsification is carried on under pressure, the supplies of fresh stock and of water and emulsifying agent being pumped into the disperser tubes under pressure which is augmented by the head of liquor in the storage chamber and may in turn be increased by means of the control valve in the discharge pipe 45.

It has been found in practice that the admission of the fresh stock and the emulsifying agent against the periphery of the impeller blades in the manner disclosed, produces much better results than prior methods, in that the blades shear off the material introduced and deliver it in the form of fine particles into the mother liquor. In the methods of emulsification heretofore used, the material to be emulsified is fed into the mother liquor in the form of a continuous and usually somewhat viscous stream and dispersion takes place more slowly and is effected with greater difficulty. The new method results in a much more rapid emulsification and the emulsion is of improved character, because it is more uniform and the dispersion is finer. The prevention of infiltration of air and the emulsification under pressure insure that the impeller blades will have a high degree of effectiveness in creating the necessary turbulence and agitation and the use of the partitions in the bottom of the bowl result in turbulent conditions in the circulating chamber which also assist in producing uniformity in the final product.

What I claim is:

1. A method of making emulsions which comprises continuously circulating a stream of mother liquor containing previously emulsified material, water, and emulsifying agent, sub-dividing said stream, enriching one sub-division in material to be emulsified and diluting the other sub-division, combining said stream, subjecting the combined stream to agitation, and continuously withdrawing a portion of said combined stream.

2. A method of making emulsions which comprises continuously circulating a stream of mother liquor containing previously emulsified material, water, and emulsifying agent, sub-dividing said stream, enriching one sub-division in material to be emulsified and diluting the other sub-division, combining said stream, subjecting the combined stream to agitation, discharging the stream along a helical path into a body of liquid to effect turbulence therein, and continuously withdrawing liquid from said body.

3. A method of making emulsions which comprises continuously circulating a stream of mother liquor containing previously emulsified material, water, and emulsifying agent, introducing material to be emulsified into said stream by subjecting a stream of said material to mechanical shear, introducing water and emulsifying agent into said circulating stream by subjecting a stream of water and said agent to mechanical shear, subjecting the augmented circulating stream to hydraulic shear, leading said stream thereafter to a circulating chamber, and continuously withdrawing material from said chamber and circulating the remainder.

4. A method of making emulsions which comprises creating a stream of mother liquor containing previously emulsified material, water, and emulsifying agent, and introducing material to be emulsified into said stream by severing sections from the end of a stream of said material to be emulsified, and dispersing the material in said severed sections in said mother liquor.

5. A method of making emulsions which comprises creating a stream of mother liquor containing previously emulsified material, water, and emulsifying agent, and introducing material to be emulsified into said stream by shearing sections from the end of a stream of said material to be emulsified and distributing the material in said sections through said stream of mother liquor.

6. A method of making emulsions which comprises creating a stream of mother liquor containing previously emulsified material, water, and emulsifying agent, sub-dividing said stream, introducing material to be emulsified into a part of the sub-divisions of said stream of mother liquor by severing sections from the end of a stream of said material to be emulsified and mixing said sections with said mother liquor, and thereafter combining said sub-divisions.

7. A method of making emulsions which comprises creating a stream of mother liquor containing previously emulsified material, water and emulsifying agent, introducing material to be emulsified into said mother liquor by severing sections from the end of a stream of said material to be emulsified and mingling said sections with said mother liquor, separately introducing water and emulsifying agent into said mother liquor by severing sections from the end of a stream of water and emulsifying agent and mingling said sections with said mother liquor, and subjecting said stream of mother liquor with said additions to agitation.

THOMAS ROBINSON.